United States Patent
Kuze et al.

(10) Patent No.: US 9,502,714 B2
(45) Date of Patent: Nov. 22, 2016

(54) MIXED METAL OXIDE, ELECTRODE, AND SODIUM SECONDARY BATTERY

(75) Inventors: Satoru Kuze, Tsukuba (JP); Masami Makidera, Tsukuba (JP); Taketsugu Yamamoto, Tsukuba (JP)

(73) Assignee: SUMITOMO CHEMICAL COMPANY, LIMITED, Tokyo (JP)

( * ) Notice: Subject to any disclaimer, the term of this patent is extended or adjusted under 35 U.S.C. 154(b) by 239 days.

(21) Appl. No.: 13/256,159

(22) PCT Filed: Mar. 10, 2010

(86) PCT No.: PCT/JP2010/054474
§ 371 (c)(1),
(2), (4) Date: Sep. 12, 2011

(87) PCT Pub. No.: WO2010/104202
PCT Pub. Date: Sep. 16, 2010

(65) Prior Publication Data
US 2012/0015230 A1    Jan. 19, 2012

(30) Foreign Application Priority Data

Mar. 13, 2009  (JP) ................................ 2009-060939

(51) Int. Cl.
*H01M 4/131*     (2010.01)
*H01M 4/50*      (2010.01)
(Continued)

(52) U.S. Cl.
CPC ............ *H01M 4/50* (2013.01); *C01G 45/1228* (2013.01); *C01G 49/0018* (2013.01);
(Continued)

(58) Field of Classification Search
CPC .................... H01M 4/483; H01M 4/50; H01M 10/054; H01M 4/485
(Continued)

(56) References Cited

U.S. PATENT DOCUMENTS

| 4,912,081 A | 3/1990 | Sofranko et al. |
| 6,080,507 A * | 6/2000 | Yu .................................. 429/62 |

(Continued)

FOREIGN PATENT DOCUMENTS

| CN | 101043093 A | 9/2007 |
| CN | 101168128 A | 4/2008 |

(Continued)

OTHER PUBLICATIONS

Office Action issued Aug. 28, 2013 in counterpart Chinese Patent Application No. 201080011025.1 with English translation.
(Continued)

*Primary Examiner* — Nicholas P D'Aniello
(74) *Attorney, Agent, or Firm* — Sughrue Mion, PLLC

(57) ABSTRACT

Disclosed is a mixed metal oxide comprising Na, $M^1$, and $M^2$, where $M^1$ represents at least one element selected from the group consisting of Mg, Ca, Sr, and Ba; and $M^2$ represents at least one element selected from the group consisting of Mn, Fe, Co, and Ni, wherein the molar ratio of Na:$M^1$:$M^2$ is a:b:1, where a is a value within the range of not less than 0.5 and less than 1; b is a value within the range of more than 0 and not more than 0.5; and "a+b" is a value within the range of more than 0.5 and not more than 1. An electrode having an active material containing the mixed metal oxide is also disclosed. Further disclosed is an electrode containing the electrode active material as well as a sodium secondary battery comprising the electrode as a positive electrode.

8 Claims, 4 Drawing Sheets

(51) Int. Cl.

| | | |
|---|---|---|
| C01G 45/12 | (2006.01) | |
| C01G 49/00 | (2006.01) | |
| C01G 51/00 | (2006.01) | |
| C01G 53/00 | (2006.01) | |
| H01M 2/16 | (2006.01) | |
| H01M 4/48 | (2010.01) | |
| H01M 4/485 | (2010.01) | |
| H01M 10/054 | (2010.01) | |
| H01M 10/0565 | (2010.01) | |
| H01M 10/0568 | (2010.01) | |
| H01M 10/0569 | (2010.01) | |
| H01M 10/36 | (2010.01) | |
| H01M 4/505 | (2010.01) | |
| H01M 4/525 | (2010.01) | |
| H01M 4/02 | (2006.01) | |

(52) U.S. Cl.
CPC ....... *C01G 49/0027* (2013.01); *C01G 49/0036* (2013.01); *C01G 51/006* (2013.01); *C01G 51/42* (2013.01); *C01G 53/42* (2013.01); *C01G 53/50* (2013.01); *H01M 2/16* (2013.01); *H01M 2/1686* (2013.01); *H01M 4/483* (2013.01); *H01M 4/485* (2013.01); *H01M 10/054* (2013.01); *H01M 10/0565* (2013.01); *H01M 10/0568* (2013.01); *H01M 10/0569* (2013.01); *H01M 10/36* (2013.01); *C01P 2002/52* (2013.01); *C01P 2002/54* (2013.01); *C01P 2002/72* (2013.01); *C01P 2004/32* (2013.01); *C01P 2004/54* (2013.01); *C01P 2006/16* (2013.01); *C01P 2006/40* (2013.01); *C01P 2006/80* (2013.01); *H01M 4/505* (2013.01); *H01M 4/525* (2013.01); *H01M 2004/028* (2013.01); *H01M 2200/10* (2013.01); *H01M 2300/002* (2013.01); *H01M 2300/0025* (2013.01); *H01M 2300/0088* (2013.01); *Y02E 60/122* (2013.01)

(58) Field of Classification Search
USPC .................................................. 429/246, 221
See application file for complete search history.

(56) References Cited

U.S. PATENT DOCUMENTS

| | | | |
|---|---|---|---|
| 2002/0034689 A1 | 3/2002 | Hoshida et al. | |
| 2002/0090552 A1 | 7/2002 | Kusumoto et al. | |
| 2004/0214086 A1* | 10/2004 | Bruce et al. | 429/224 |
| 2005/0238961 A1* | 10/2005 | Barker et al. | 429/231.4 |
| 2006/0055075 A1 | 3/2006 | Hoshida et al. | |
| 2007/0212605 A1 | 9/2007 | Yamaki et al. | |
| 2007/0218361 A1* | 9/2007 | Inoue et al. | 429/231.1 |
| 2009/0053613 A1 | 2/2009 | Inoue et al. | |
| 2010/0248001 A1 | 9/2010 | Kuze et al. | |

FOREIGN PATENT DOCUMENTS

| | | |
|---|---|---|
| JP | 11-040156 A | 2/1999 |
| JP | 11-317225 A | 11/1999 |
| JP | 2001-332258 A | 11/2001 |
| JP | 2002-069221 A | 3/2002 |
| JP | 2002-151074 A | 5/2002 |
| JP | 2002-280623 A | 9/2002 |
| JP | 2004-533706 A | 11/2004 |
| JP | 2005-520282 A | 7/2005 |
| JP | 2005-317511 A | 11/2005 |
| JP | 2006-216508 A | 8/2006 |
| JP | 2007-287661 A | 11/2007 |
| JP | 2009-135092 A | 6/2009 |
| JP | 2009-227505 A | 10/2009 |
| WO | 02/097907 A2 | 12/2002 |
| WO | 2006/057307 A1 | 6/2006 |

OTHER PUBLICATIONS

Velikokhatnyi, O.I., et al., "Effect of Boron on the Stability of Monoclinic NaMnO2: Theoretical and Experimental Studies," Elsevier, Materials Science and Engineering B 128 (2006), pp. 115-124.
Extended European Search Report dated Mar. 28, 2013 issued in European Patent Application No. 10750947.3.
C. Li, et al., "Nonstoichiometric Alkali Ferrites and Aluminates in the Systems $NaFeO_2$—$TiO_2$,$KFeO_2$—$TiO_2$, $KAlO_2$—$TiO_2$, and $KAlO_2$—$SiO_2$", Journal of Solid State Chemistry, 1971, pp. 614-620, vol. 3.
Notice of Reasons for Rejection issued Jun. 24, 2014 in counterpart Japanese Patent Application No. 2010-045022 with English translation.
Office Action issued Apr. 28, 2014 in counterpart Chinese Patent Application No. 201080011025.1 with English Translation.
T. Itoh, et al., "Transport Properties in (Na,Ca) $CO_2O_4$ Ceramics," 17th International Conference on Thermoelectrics (1998) 595-597.
J. Sugiyama, et al., "Spin state transition in Ca-doped $Na0.7CoO_2$ with the normal Co valence below 3.16," Solid State Communications 137 (2006) 36-40.
Feipeng Zhang et al., "Development of Ca (Na)—Co-O Thermoelectric Oxides," Journal of Functional Materials, vol. 38, Issue 9, 1393-1396 (2007).
Office Action issued Oct. 20, 2014 in counterpart Chinese Patent Application No. 201080011025.1 with English translation.
Office Action issued on Mar. 25, 2015 in Chinese application No. 201080011025.1 with English translation.
Communication dated Dec. 18, 2015 from the Korean Intellectual Property Office in counterpart application No. 10-2011-7020781.
Yabuuchi, et al., Chemical Reviews "Research Development on Sodium-Ion Batteries", 2014, 114, pp. 11636-11682.
Wang, et al., Journal of Materials Chemistry A: "Recent Developments in Electrode Materials for Sodium-Ion Batteries", Mar. 2015, pp. 9353-9378.
Communication dated Jun. 21, 2016 issued by the Korean Intellectual Property Office in counterpart application No. 1020117020781.

* cited by examiner

MIXED METAL OXIDE, ELECTRODE, AND SODIUM SECONDARY BATTERY

CROSS REFERENCE TO RELATED APPLICATIONS

This application is a National Stage of International Application No. PCT/JP2010/054474 filed Mar. 10, 2010, claiming priority based on Japanese Patent Application No. 2009-060939 filed Mar. 13, 2009, the contents of all of which are incorporated herein by reference in their entirety.

TECHNICAL FIELD

The present invention relates to a mixed metal oxide, an electrode, and a sodium secondary battery.

BACKGROUND ART

Mixed metal oxides are used as an electrode active material of a secondary battery. Among secondary batteries, a lithium secondary battery has already been put into practical use as a small-sized power source for, e.g., a mobile phone and a notebook computer; can be used as a power source for vehicles such as an electric vehicle and a hybrid vehicle, and a large-sized power source such as a distributed power source for power storage, and therefore the demand therefor is on the rise. However, in a lithium secondary battery, many rare metal elements such as lithium are used as a raw material for its electrode active material, so that there is a problem of supplying of the above-described raw material in response to increased demand for a large-sized power source.

In response, as a secondary battery that can resolve the supply problem of the battery materials, a sodium secondary battery has been studied. A sodium secondary battery can be composed of materials that are rich in resources and also inexpensive, and it is expected that, by putting it into practical use, a large-sized power source will be supplied in large quantities.

As an electrode active material for a sodium secondary battery, a mixed metal oxide, $NaFeO_2$, is known (JP 2005-317511 A).

DISCLOSURE OF THE INVENTION

However, the secondary battery using an electrode active material composed of the mixed metal oxide, $NaFeO_2$, in JP 2005-317511 A, compared to existing lithium secondary batteries, can reduce the used amount of rare metals such as cobalt, nickel, and lithium, but does not have sufficient performance as a secondary battery, for example, the discharge capacity exhibited when a charge and discharge is conducted repeatedly. An object of the present invention is to provide a sodium secondary battery having a larger discharge capacity exhibited when a charge and discharge is conducted repeatedly than that of conventional sodium secondary batteries, and a mixed metal oxide that can be used as an electrode active material thereof.

The present inventors intensively studied to solve the above problems, thereby accomplishing the present invention. Thus the present invention provides the following invention.

<1> A mixed metal oxide comprising Na, $M^1$, and $M^2$, where $M^1$ represents at least one element selected from the group consisting of Mg, Ca, Sr, and Ba; and $M^2$ represents at least one element selected from the group consisting of Mn, Fe, Co, and Ni;
wherein the molar ratio of Na:$M^1$:$M^2$ is a:b:1, where a is a value within the range of not less than 0.5 and less than 1; b is a value within the range of more than 0 and not more than 0.5; and "a+b" is a value within the range of more than 0.5 and not more than 1.

<2> The mixed metal oxide according to the above <1>, wherein $M^1$ comprises Ca.

<3> The mixed metal oxide according to the above <1> or <2>, wherein $M^1$ comprises Sr.

<4> An electrode active material containing the mixed metal oxide according to any one of the above <1> to <3>.

<5> An electrode comprising the electrode active material according to the above <4>.

<6> A sodium secondary battery comprising the electrode according to the above <5> as a positive electrode.

<7> The sodium secondary battery according to the above <6> further comprising a separator.

<8> The sodium secondary battery according to the above <7>, wherein the separator is a separator comprising a laminated film which has a heat resistant porous layer and a porous film laminated to each other.

MODE FOR CARRYING OUT THE INVENTION

Figure 1:
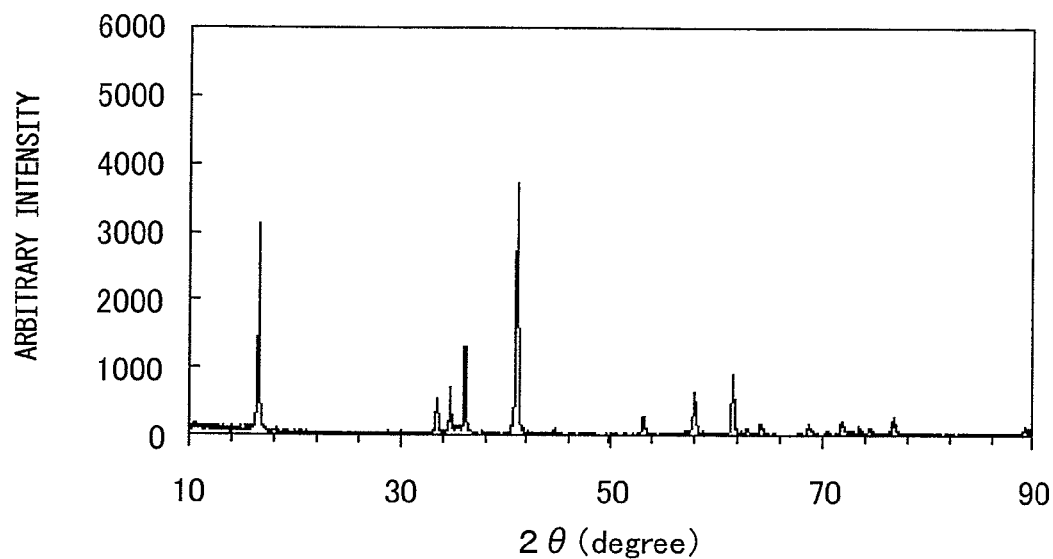
FIG. 1 shows a powder X-ray diffraction pattern of the mixed metal oxide C1.

The Mixed Metal Oxide of the Present Invention

The mixed metal oxide of the present invention comprises Na, $M^1$, and $M^2$, where $M^1$ represents at least one element selected from the group consisting of Mg, Ca, Sr, and Ba, and $M^2$ represents at least one element selected from the group consisting of Mn, Fe, Co, and Ni, wherein the molar ratio of Na:$M^1$:$M^2$ is a:b:1, where a is a value within the range of not less than 0.5 and less than 1; b is a value within the range of more than 0 and not more than 0.5; and "a+b" is a value within the range of more than 0.5 and not more than 1.

The mixed metal oxide of the present invention is preferably represented by the following formula (1).

$$Na_a M^1_b M^2 O_2 \qquad (1)$$

wherein $M^1$ represents at least one element selected from the group consisting of Mg, Ca, Sr, and Ba; $M^2$ represents at least one element selected from the group consisting of Mn, Fe, Co, and Ni; a is a value within the range of not less than 0.5 and less than 1; b is a value within the range of more than 0 and not more than 0.5; and "a+b" is a value within the range of more than 0.5 and not more than 1.

In the formula (1), the value 2 which is the molar ratio of oxygen element may vary slightly. The variation range is, for example, about 2±0.5, i.e., the molar ratio of oxygen atom in the formula (1) is about not less than (2−0.5) and not more than (2+0.5).

In the mixed metal oxide of the present invention, preferably, $M^1$ comprises Ca, and more preferably, $M^1$ is Ca. In this case, for the resulting secondary battery, in view of increasing the discharge capacity exhibited when the charge and discharge, which is performed in such a manner that the battery is discharged after being charged to a high voltage, is conducted repeatedly, preferably, $M^2$ comprises Fe and/or Mn, and more preferably, $M^2$ is Fe and/or Mn.

In the mixed metal oxide of the present invention, preferably, $M^1$ comprises Sr, and more preferably, $M^1$ is Sr. In this case, for the resulting secondary battery, in view of increasing the discharge capacity exhibited when the charge and discharge, which is performed in such a manner that the battery is discharged after being charged to a high voltage, is conducted repeatedly, preferably, $M^2$ comprises Fe, and more preferably, $M^2$ is Fe.

In the mixed metal oxide of the present invention, preferably, $M^1$ comprises Mg, and more preferably, $M^1$ is Mg. In this case, for the resulting secondary battery, the average potential when the charge and discharge, which is performed in such a manner that the battery is discharged after being charged to a high voltage, is conducted repeatedly is high, and the energy density of the sodium secondary battery becomes high.

Further, in the mixed metal oxide of the present invention, preferably, $M^2$ comprises Fe, and more preferably, $M^2$ is Mn, Fe, and Ni. In this case, the discharge capacity exhibited when the charge and discharge, which is performed in such a manner that the resulting secondary battery is discharged after being charged to a high voltage, is conducted repeatedly becomes high.

The above b is preferably a value within the range of more than 0 and not more than 0.5, more preferably a value within the range of not less than 0.05 and not more than 0.2.

The above "a+b" is preferably a value within the range of not less than 0.7 and not more than 1.

In the mixed metal oxide of the present invention, a part of $M^2$ may be substituted with a metal element other than $M^2$ (for example, Ti, V, Mo, W, and Cu). The substitution can improve the battery properties of the sodium secondary battery.

<Method of Producing the Mixed Metal Oxide of the Present Invention>

The mixed metal oxide of the present invention can be produced by calcining a mixture of metal-containing compounds having a composition that can be converted into the mixed metal oxide of the present invention by the calcination. Specifically, the mixed metal oxide of the present invention can be produced by weighing metal-containing compounds containing the corresponding metal elements to give a desired composition, mixing these compounds, and calcining the mixture thus obtained. For example, the mixed metal oxide having a preferable molar ratio of Na:Ca: Fe=0.90:0.10:1.00 can be produced by weighing each raw material, $Na_2CO_3$, $CaCO_3$, and $Fe_3O_4$, to give a molar ratio of Na:Ca:Fe of 0.90:0.10:1.00, mixing them, and calcining the mixture thus obtained. In this case, the resulting mixed metal oxide can be expressed as $Na_{0.9}Ca_{0.1}FeO_2$, which is obtained by substituting Ca, Fe, 0.9, and 0.1 into $M^1$, $M^2$, a, and b, respectively, in the above formula (1).

Examples of the above-described metal-containing compound that can be used to produce the mixed metal oxide of the present invention include oxides and compounds that can be converted into an oxide when decomposed and/or oxidized at high temperatures, for example, hydroxides, carbonates, nitrates, halides, and oxalates. As a sodium compound, at least one compound selected from the group consisting of $Na_2CO_3$, $NaHCO_3$, and $Na_2O_2$ is preferable; in view of ease of handle, $Na_2CO_3$ is more preferable. As a magnesium compound, at least one compound selected from the group consisting of $MgCO_3$, $Mg(OH)_2$, and MgO is preferable. As a calcium compound, at least one compound selected from the group consisting of $CaCO_3$, $Ca(OH)_2$, and CaO is preferable. As a strontium compound, at least one compound selected from the group consisting of $SrCO_3$, $Sr(OH)_2$, and SrO is preferable. As a barium compound, at least one compound selected from the group consisting of $BaCO_3$, $Ba(OH)_2$, and BaO is preferable. As a manganese compound, $MnO_2$ is preferable; as an iron compound, $Fe_3O_4$ is preferable; as a cobalt compound, $CO_3O_4$ is preferable; and as a nickel compound, NiO is preferable. These metal-containing compounds may be hydrates.

In mixing the above-described metal-containing compounds, apparatuses commonly used industrially such as a ball mill, a V-shaped mixer, and a stirrer can be used. The mixing may be carried out either by dry mixing or by wet mixing. The mixture of metal-containing compounds having a desired composition obtained by a crystallization method may also be used as a raw material of the mixed metal oxide.

The mixed metal oxide of the present invention is obtained by calcining the mixture of the above-described metal-containing compounds while maintaining the temperature, for example, in a range of 600° C. to 1600° C. over 0.5 hours to 100 hours. Preferably, the calcination temperature range is 600° C. to 900° C., more preferably 650° C. to 850° C. In cases where compounds that can be decomposed and/or oxidized at high temperatures, for example, hydroxides, carbonates, nitrates, halides, and oxalates are used as a mixture of metal-containing compounds, pre-calcination can be performed before calcining the mixture. Specifically, the pre-calcination is performed by maintaining the mixture in the temperature range of 400° C. to 1600° C. and at a temperature lower than the calcination temperature. This pre-calcination allows the conversion of the metal-containing compounds in the mixture into an oxide and the removal of the water of crystallization. The atmosphere in which the pre-calcination is performed may be any of an inert gas atmosphere, an oxidizing atmosphere, or a reducing atmosphere. Further, pulverization can be performed after the pre-calcination.

Examples of the atmosphere at calcination include, for example, inert atmospheres such as nitrogen and argon; oxidizing atmospheres such as air, oxygen, oxygen-containing nitrogen, and oxygen-containing argon; and reducing atmospheres such as hydrogen-containing nitrogen which contains 0.1% by volume to 10% by volume of hydrogen and hydrogen-containing argon which contains 0.1% by volume to 10% by volume of hydrogen. To carry out the calcination in a strongly reducing atmosphere, a mixture of metal-containing compounds containing an appropriate amount of carbon may be calcined. Preferable calcination atmosphere is an oxidizing atmosphere, particularly air.

By using as a metal-containing compound an appropriate amount of halides such as fluoride and chloride, the crystallinity of the mixed metal oxide to be generated and the average particle size of the particles constituting the mixed metal oxide can be controlled. In this case, the halides may serve as a reaction accelerator (flux). Examples of the flux include, for example, NaF, $MgF_2$, $CaF_2$, $SrF_2$, $BaF_2$, $MnF_3$, $FeF_2$, $NiF_2$, NaCl, $MgCl_2$, $CaCl_2$, $SrCl_2$, $BaCl_2$, $MnCl_2$, $FeCl_2$, $FeCl_3$, $NiCl_2$, $Na_2CO_3$, $NaHCO_3$, $NH_4Cl$, $NH_4I$, $B_2O_3$, and $H_3BO_3$. Fluxes are used as a raw material (metal-containing compound) of the mixture, or as an additive in an appropriate amount to the mixture. These fluxes may be hydrates.

The mixed metal oxide of the present invention can be used as an electrode active material of, for example, a secondary battery. When used as an electrode active material, for the mixed metal oxide obtained as described above, it can be preferable to control the particle size of the mixed metal oxide by optionally performing the operations such as pulverization using, for example, a ball mill or a jet mill, washing, and classification. The calcination may be performed more than once. Surface treatments such as coating the particle surface of the mixed metal oxide with an inorganic substance containing, for example, Si, Al, Ti, and Y may be performed. The mixed metal oxide of the present invention is preferably one in which its crystalline structure comprises a layered structure.

The mixed metal oxide of the present invention can be used, as an electrode active material, by itself or after undergoing surface treatments such as coating. The electrode active material of the present invention contains the mixed metal oxide of the present invention. When an electrode which contains the electrode active material of the present invention is used as a positive electrode of a sodium secondary battery, the resulting secondary battery will have a larger discharge capacity exhibited when a charge and discharge is conducted repeatedly than that of conventional one. The present invention reduces not only the internal resistance of the resulting sodium secondary battery but also the overvoltage in charging and discharging. If the overvoltage in charging and discharging can be reduced, the high-current discharging properties of a secondary battery can be further enhanced. The stability of a secondary battery when overcharged can also be improved.

<The Electrode of the Present Invention and the Method of Producing the Same>

The electrode of the present invention contains the electrode active material of the present invention. The electrode of the present invention can be produced by supporting on the electrode current collector an electrode mixture comprising the electrode active material of the present invention, a conductive material, and a binder.

Examples of the conductive material include carbonaceous materials such as natural graphite, artificial graphite, cokes, and carbon black. Examples of the binder include thermoplastic resins, specifically, fluororesins such as polyvinylidene fluoride (hereinafter also referred to as "PVDF"), polytetrafluoroethylene, tetrafluoroethylene-hexafluoropropylene-vinylidene fluoride copolymer, hexafluoropropylene-vinylidene fluoride copolymer, and tetrafluoroethylene-perfluorovinyl ether copolymer; and polyolefin resins such as polyethylene and polypropylene. Examples of the electrode current collector that can be used include Al, Ni, and stainless.

Examples of the method of supporting an electrode mixture on an electrode current collector include the method of pressure molding, or the method of pasting an electrode mixture using, for example, an organic solvent, applying the paste thus obtained on the electrode current collector, drying the paste, and fixing the dried paste, for example, by pressing. In pasting, the paste is prepared using an electrode active material, a conductive material, a binder, and an organic solvent. Examples of the organic solvent include amine solvents such as N,N-dimethylaminopropyl amine and diethyltriamine; ether solvents such as ethylene oxide and tetrahydrofuran; ketone solvents such as methyl ethyl ketone; ester solvents such as methyl acetate; and aprotic polar solvents such as dimethylacetamide and N-methyl-2-pyrrolidone. Examples of the method of applying an electrode mixture on an electrode current collector include, for example, slit die coating method, screen coating method, curtain coating method, knife coating method, gravure coating method, and electrostatic spray method.

<The Sodium Secondary Battery of the Present Invention>

The sodium secondary battery of the present invention comprises the electrode of the present invention as a positive electrode. The sodium secondary battery of the present invention can be produced by, for example, laminating or laminating/winding the electrode of the present invention (positive electrode), a separator, a negative electrode in which a negative electrode mixture is supported on a negative electrode current collector, and a separator in the order mentioned to obtain an electrode group, storing the electrode group in a battery case, and impregnating the electrode group with an electrolyte solution containing an electrolyte and an organic solvent.

Examples of the shape of the electrode group include, for example, such a shape that the cross section taken perpendicular to the winding axis of the electrode group is circular, oval, ellipsoidal, rectangular, or round-cornered rectangular. Examples of the shape of the battery include, for example, shapes such as paper-type, coin-type, cylindrical, and prismatic.

<The Sodium Secondary Battery of the Present Invention—Negative Electrode>

Examples of the negative electrode that can be used in the sodium secondary battery of the present invention include a negative electrode current collector on which an negative electrode mixture comprising a negative electrode active material is supported, and an electrode capable of occluding/desorbing sodium ions in, for example, sodium metal or sodium alloy. Examples of the negative electrode active material include carbonaceous materials capable of occluding/desorbing sodium ions, such as natural graphite, artificial graphite, cokes, carbon black, pyrocarbons, carbon fiber, and baked body of an organic macromolecular compound. The shape of the carbonaceous material may be any of, for example, flaky as in natural graphite, spherical as in a mesocarbon microbead, fibrous as in graphitized carbon fiber, or an aggregate of fine powder. The carbonaceous material may serve as a conductive material.

Among chalcogen compounds such as oxides and sulfides, those which is capable of occluding/desorbing sodium ions at a lower potential than in the positive electrode can also be used as a negative electrode active material.

The negative electrode mixture may optionally contain a binder and a conductive material. Therefore, the negative electrode of the sodium secondary battery of the present invention may contain a mixture of a negative electrode active material and a binder. Examples of the binder include thermoplastic resins, specifically, at least one selected from the group consisting of PVDF, thermoplastic polyimide, carboxymethylcellulose, polyethylene, and polypropylene.

Examples of the negative electrode current collector include Cu, Ni, and stainless, among which Cu is preferable in that it is not easily alloyed with sodium and that it can be easily processed into a thin film. Examples of the method of supporting a negative electrode mixture on a negative electrode current collector include, as in the case of the positive electrode described above, the method of pressure molding, and the method of pasting using, for example, a solvent, coating the paste thus obtained on the negative electrode current collector, drying the paste, and fixing the dried paste, for example, by pressing.

<The Sodium Secondary Battery of the Present Invention—Separator>

Examples of the raw material of the separator that can be used in the sodium secondary battery of the present invention include, for example, polyolefin resins such as polyethylene and polypropylene, fluororesins, and nitrogen-containing aromatic polymers, and materials which are made of these raw materials and have the form of, for example, a porous film, a nonwoven fabric, and a woven fabric can be used as a separator. Two or more of these raw materials and materials may be used to form a monolayer separator or a laminated separator. Examples of the separator include, for example, the separator described, for example, in JP 2000-30686 A or JP 10-324758A. As long as the mechanical strength is maintained, the thickness of the separator is preferably as thin as possible because if it is thin, the volume energy density of the battery will increase, and the internal resistance will decrease. Generally, the thickness of the separator is preferably around from 5 to 200 µm, more preferably around from 5 to 40 µm.

The separator preferably comprises a porous film containing a thermoplastic resin. In the secondary battery, the separator is positioned between the positive electrode and the negative electrode. In charging and discharging of the secondary battery, when an abnormal current flows through the battery because of, for example, a short circuit between the positive electrode and the negative electrode, the separator preferably serves to prevent excessive current flow by blocking the current (to shutdown). The shutdown is performed, when above the normal service temperature, by clogging the micropores of the porous film in the separator. Preferably, even if the temperature in the battery rises to a certain degree of high temperature after the shutdown, the shutdown state is maintained without causing the film rupture due to the temperature, in other words, heat resistance is high. Examples of such separators include a porous film comprising a heat resistant material, such as a laminated film which has a heat resistant porous layer(s) and a porous film laminated to each other, preferably, a laminated film which has a heat resistant porous layer(s) containing a heat resistant resin and a porous film containing a thermoplastic resin laminated to each other. By using as a separator such a porous film comprising a heat resistant material, the thermal film rupture of the secondary battery of the present invention can be further prevented. The heat resistant porous layer may be laminated on both sides of the porous film.

<The Sodium Secondary Battery of the Present Invention—Separator-Laminated Film>

The laminated film which has a heat resistant porous layer(s) and a porous film laminated to each other, which is preferable as a separator, will now be described. The thickness of the separator is generally not less than 5 µm and not more than 40 µm, preferably not more than 20 µm. When the thickness of the heat resistant porous layer is assumed to be A (µm) and the thickness of the porous film is assumed to be B (µm), the value A/B is preferably not less than 0.1 and not more than 1. Further, in view of ion permeability, the separator preferably has an air permeability according to the Gurley method of 50 to 300 sec/100 cc, more preferably 50 to 200 sec/100 cc. The porosity of the separator is generally 30 to 80% by volume, preferably 40 to 70% by volume.

(Heat-Resistant Porous Layer)

In the laminated film, the heat resistant porous layer preferably contains a heat resistant resin. For further increasing the ion permeability, the heat resistant porous layer preferably has a thickness as thin as not less than 1 µm and not more than 10 µm, more preferably not less than 1 µm and not more than 5 µm, and especially preferably not less than 1 µm and not more than 4 µm. The heat resistant porous layer has micropores, the size (diameter) of which is generally not more than 3 µm, preferably not more than 1 µm. Further, the heat resistant porous layer can contain the filler described below. The heat resistant porous layer may be composed of inorganic powder.

Examples of the heat resistant resin contained in the heat resistant porous layer include polyamide, polyimide, polyamide-imide, polycarbonate, polyacetal, polysulfone, polyphenylene sulfide, polyether ketone, aromatic polyester, polyether sulfone, and polyetherimide; in view of further increasing the heat resistance, polyamide, polyimide, polyamide-imide, polyether sulfone, and polyetherimide are preferable, and polyamide, polyimide, and polyamide-imide are more preferable. Still more preferably, the heat resistant resin is nitrogen-containing aromatic polymers such as aromatic polyamide (para-oriented aromatic polyamide, meta-oriented aromatic polyamide), aromatic polyimide, and aromatic polyamide-imide, among which aromatic polyamide is preferable, and para-oriented aromatic polyamide (which hereinafter may be referred to as "para-aramid") is especially preferable. Examples of the heat resistant resin also include poly-4-methylpentene-1 and cyclic olefin polymers. By using these heat resistant resins, heat resistance can be increased; i.e., thermal film rupture temperature can be raised.

The thermal film rupture temperature, which is dependent on the type of the heat resistant resin, is selected and used according to the context and purpose of use. Generally, the thermal film rupture temperature is 160° C. or more. When using as a heat resistant resin the above-described nitrogen-containing aromatic polymer, poly-4-methylpentene-1, and cyclic olefin polymers, the thermal film rupture temperature can be controlled at about 400° C., about 250° C., and about 300° C., respectively. When the heat resistant porous layer is composed of inorganic powder, the thermal film rupture temperature can be controlled, for example, at 500° C. or more.

The above-described para-aramid is obtained by the condensation polymerization of para-oriented aromatic diamines with para-oriented aromatic dicarboxylic acid halides, and consists essentially of the repeating units which are bonded to each other through an amide bond at para position or orientation positions equivalent thereto (for example, orientation positions from which the para-aramid extends in the opposite direction coaxially or parallel to each other as in 4,4'-biphenylene, 1,5-naphthalene, and 2,6-naphthalene) of the aromatic ring. Examples of the para-aramid include para-aramid having a para-oriented structure or structure equivalent to the para-oriented structure, specifically, poly(p-phenylene terephthalamide), poly(p-benzamide), poly(4,4'-benzanilide terephthalamide), poly(p-phenylene-4,4'-biphenylene dicarboxamide), poly(p-phenylene-2,6-naphthalenedicarboxamide), poly(2-chloro-p-phenylene terephthalamide), and p-phenylene terephthalamide/2,6-dichloro p-phenylene terephthalamide copolymer.

As the above-described aromatic polyimide, wholly aromatic polyimides formed by the condensation polymerization of aromatic dianhydrides and aromatic diamines are preferable. Specific examples of the dianhydride include pyromellitic dianhydride, 3,3',4,4'-diphenylsulfone tetracarboxylic dianhydride, 3,3',4,4'-benzophenone tetracarboxylic dianhydride, 2,2'-bis(3,4-dicarboxyphenyl)hexafluoropropane, and 3,3',4,4'-biphenyltetracarboxylic dianhydride. Examples of the diamine include oxydianiline, p-phenylenediamine, benzophenonediamine, 3,3'-methylenedianiline, 3,3'-diamino benzophenone, 3,3'-diaminodiphenylsulfone, and 1,5'-naphthalenediamine. Polyimide soluble in a solvent can be suitably used. Examples of such polyimide include, for example, the polyimide which is a polycondensate of 3,3',4,4'-diphenylsulfone tetracarboxylic dianhydride and aromatic diamines.

Examples of the above-described aromatic polyamide-imide include those which are obtained by the condensation polymerization using aromatic dicarboxylic acids and aromatic diisocyanates, and those which are obtained by the condensation polymerization using aromatic dianhydrides and aromatic diisocyanates. Specific examples of the aromatic dicarboxylic acid include, for example, isophthalic acid and terephthalic acid. Specific examples of the aromatic dianhydride include, for example, trimellitic anhydride. Specific examples of the aromatic diisocyanate include, for example, 4,4'-diphenylmethane diisocyanate, 2,4-tolylene diisocyanate, 2,6-tolylene diisocyanate, orthotolylane diisocyanate, and m-xylene diisocyanate.

When the heat resistant porous layer contains a heat resistant resin, the heat resistant porous layer may contain at least one filler. The filler that may be contained in the heat resistant porous layer may be one selected from any of organic powder, inorganic powder, or a mixture thereof. The particles which constitute the filler preferably have an average particle size of not less than 0.01 μm and not more than 1 μm. Examples of the shape of the filler include substantially spherical, platy, columnar, acicular, whisker-like, and fibrous. Although any particle can be used, substantially spherical particles are preferable because they easily form uniform pores. Examples of the substantially spherical particle include the particle having a particle aspect ratio (major axis of particle/minor axis of particle) of not less than 1 and not more than 1.5. The aspect ratio the particle can be measured from electron micrographs.

Examples of the organic powder as a filler include, for example, homopolymers of styrene, vinyl ketone, acrylonitrile, methyl methacrylate, ethyl methacrylate, glycidyl methacrylate, glycidyl acrylate, methyl acrylate, etc., or copolymers of two or more thereof; fluorine resins such as polytetrafluoroethylene, tetrafluoroethylene-hexafluoropropylene copolymer, tetrafluoroethylene-ethylene copolymer, and polyvinylidene fluoride; melamine resins; urea resins; polyolefins; and the powder composed of organic matter such as polymethacrylate. The organic powder may be used alone or in combination of two or more thereof. Among these organic powders, polytetrafluoroethylene powder is preferable in view of chemical stability.

Examples of the inorganic powder as a filler include, for example, the powder composed of inorganic matter such as metal oxides, metal nitrides, metal carbides, metal hydroxides, carbonates, and sulfates, among which the powder composed of the inorganic matter with low conductivity is preferably used. Specific examples include powder composed of, for example, alumina, silica, titanium dioxide, barium sulfate, or calcium carbonate. The inorganic powder may be used alone or in combination of two or more thereof. Among these inorganic powders, alumina powder is preferable in view of chemical stability. More preferably, all of the particles which constitute the filler are alumina particles; still more preferably, all of the particles which constitute the filler are alumina particles, and part or all of them are substantially spherical alumina particles. Incidentally, when the heat resistant porous layer is composed of inorganic powder, the above-exemplified inorganic powder may be used, and it may be used in combination with a binder, if necessary.

The filler content when the heat resistant porous layer contains a heat resistant resin depends on specific gravity of the material of the filler. For example, in cases where all the particles which constitute the filler are alumina particles, when the total weight of the heat resistant porous layer is taken as 100, the weight of the filler is generally not less than 5 and not more than 95, preferably not less than 20 and not more than 95, and more preferably not less than 30 and not more than 90. These ranges can be appropriately set depending on specific gravity of the material of the filler.

(Porous Film)

In the laminated film, the porous film preferably has micropores to shutdown. In this case, the porous film contains a thermoplastic resin. The thickness of the porous film is generally 3 to 30 μm, more preferably 3 to 25 μm. The porous film, similarly to the above-described heat resistant porous layer, has micropores, the size of which is generally not more than 3 μm, preferably not more than 1 μm. The porosity of the porous film is generally 30 to 80% by volume, preferably 40 to 70% by volume. In the secondary battery, when above the normal service temperature, the porous film can clog the micropores by the softening of its component, thermoplastic resin.

Examples of the thermoplastic resin contained in the porous film include those which soften at 80 to 180° C., and those which do not dissolve in an electrolyte solution in the secondary battery may be selected. Specific examples of the thermoplastic resin include polyolefin resins such as polyethylene and polypropylene; and thermoplastic polyurethane resins, and a mixture of two or more thereof may be used. For the softening and shutdown at lower temperatures, the thermoplastic resin preferably contains polyethylene. Examples of the polyethylene include, specifically, polyethylenes such as low-density polyethylene, high-density polyethylene, and linear polyethylene, as well as ultra-high molecular weight polyethylene having a molecular weight of 1,000,000 or more. To further increase the pin puncture strength of the porous film, the thermoplastic resin preferably contains ultra-high molecular weight polyethylene. From the viewpoint of production of the porous film, the thermoplastic resin may preferably contain a wax composed of a polyolefin of low molecular weight (weight average molecular weight of not more than 10,000).

Examples of the porous film comprising a heat resistant material different from that of the above-described laminated film include a porous film composed of a heat resistant resin and/or inorganic powder and a porous film in which a heat resistant resin and/or inorganic powder are dispersed in a film composed of a thermoplastic resin such as a polyolefin resin or a thermoplastic polyurethane resin. Examples of the heat resistant resin and inorganic powder include those mentioned above.

<The Sodium Secondary Battery of the Present Invention—Electrolytic Solution or Solid Electrolyte>

In the electrolyte solution that can be used in the sodium secondary battery of the present invention, examples of the electrolyte include, for example, $NaClO_4$, $NaPF_6$, $NaAsF_6$, $NaSbF_6$, $NaBF_4$, $NaCF_3SO_3$, $NaN(SO_2CF_3)_2$, lower aliphatic carboxylic sodium salts, and $NaAlCl_4$, and a mixture of two or more thereof may be used. Among them, those which comprise at least one selected from the group consisting of $NaPF_6$, $NaAsF_6$, $NaSbF_6$, $NaBF_4$, $NaCF_3SO_3$, and $NaN(SO_2CF_3)_2$ which comprise fluorine are preferably used.

In the electrolyte solution that can be used in the sodium secondary battery of the present invention, examples of the organic solvent that can be used include, for example, carbonates such as propylene carbonate, ethylene carbonate, dimethyl carbonate, diethyl carbonate, ethyl methyl carbonate, isopropyl methyl carbonate, vinylene carbonate, 4-trifluoromethyl-1,3-dioxolane-2-one, and 1,2-di(methoxycarbonyloxy)ethane; ethers such as 1,2-dimethoxyethane, 1,3-dimethoxypropane, pentafluoropropyl methyl ether, 2,2,3,3-tetrafluoropropyl difluoromethyl ether, tetrahydrofuran, and 2-methyltetrahydrofuran; esters such as methyl formate, methyl acetate, and γ-butyrolactone; nitriles such as acetonitrile and butyronitrile; amides such as N,N-dimethylformamide and N,N-dimethylacetamide; carbamates such as 3-methyl-2-oxazolidone; sulfur-containing compounds such as sulfolane, dimethyl sulfoxide, and 1,3-propane sultone; or those obtained by introducing additional fluorine substituents into the above-described organic solvents. As an organic solvent, two or more thereof may be used in combination.

A solid electrolyte may also be used instead of the above-described electrolyte solution. Examples of the solid electrolyte that can be used include, for example, an organic solid electrolyte such as a polyethylene oxide-based macromolecular compound or a macromolecular compound comprising at least one of polyorganosiloxane chains or polyoxyalkylene chains. A macromolecular compound which holds an electrolyte solution, so-called a gel-type one, may also be used. Further, inorganic solid electrolytes such as $Na_2S$—$SiS_2$, $Na_2S$—$GeS_2$, $NaTi_2(PO_4)_3$, $NaFe_2(PO_4)_3$, $Na_2(SO_4)_3$, $Fe_e(SO_4)_2(PO_4)$, and $Fe_2(MoO_4)_3$ may also be used. The use of these solid electrolytes can further improve the safety. In the sodium secondary battery of the present invention, when using a solid electrolyte, the solid electrolyte can serve as a separator, in which case a separator may not be necessary.

EXAMPLES

The present invention will now be described in more detail by way of examples, but the present invention is not restricted thereto. Unless otherwise specified, the method of preparing the electrodes and secondary batteries for charge-discharge test and the method of measuring powder X-ray diffraction are as described below.
(1) Preparation of Electrode (Positive Electrode)

Mixed metal oxide as an electrode active material, acetylene black (produced by DENKI KAGAKU KOGYO KABUSHIKI KAISHA) as a conductive material, and PVDF (produced by KUREHA CORPORATION, PolyVinylidene DiFluoride) as a binder, were individually weighed to give a composition of electrode active material:conductive material:binder=85:10:5 (weight ratio). Subsequently, the mixed metal oxide and the acetylene black were thoroughly mixed using an agate mortar, and an appropriate amount of N-methyl-2-pyrrolidone (NMP: produced by Tokyo Chemical Industry Co., Ltd.) was added to the resulting mixture. Further, PVDF was added thereto and then the resulting mixture was homogeneously mixed into a slurry. Using an applicator, the slurry obtained was applied on a 40-μm-thick aluminum foil, which is a current collector, to a thickness of 100 μm. The resultant was placed into a dryer, and thoroughly dried with removal of NMP to obtain an electrode sheet. The electrode sheet was punched with an electrode punching machine to a diameter of 1.5 cm, and then pressed sufficiently with a hand press to obtain an electrode (positive electrode).
(2) Preparation of Battery Into a hollow of the lower part of a coin cell (produced by Hohsen Corp.), the positive electrode was placed with the aluminum foil side down, and combined with $NaClO_4$/propylene carbonate having a concentration of 1 M as an electrolyte solution, a polypropylene porous film (thickness: 20 μm) as a separator, and metal sodium (produced by Aldrich) as a negative electrode to prepare a battery. The assembly of the battery was performed in a glove box under an argon atmosphere.
(3) Measurement of Powder X-Ray Diffraction The measurement was performed using a powder X-ray diffractometer RINT2500TTR type manufactured by Rigaku Corporation under the following conditions:
X-ray: CuKα
Voltage-Current: 40 kV-140 mA
Measured angular range: 2θ=10 to 90°
Step: 0.02°
Scan speed: 4°/min Comparative Example 1

Na:Fe=1.00:1.00

(1) Production of Mixed Metal Oxide

Sodium carbonate ($Na_2CO_3$: produced by Wako Pure Chemical Industries, Ltd.: purity 99.8%) and iron (II, III) oxide ($Fe_3O_4$: produced by Kojundo Chemical Lab. Co., Ltd.: purity 99%) were used as a metal-containing compound. They were weighed such that the molar ratio of Na:Fe was 1.00:1.00, and mixed over 4 hours with a dry ball mill to obtain a mixture of the metal-containing compounds. The mixture of the metal-containing compounds obtained was loaded into an alumina boat, heated in an air atmosphere using an electric furnace, and calcined while maintaining at 650° C. over 2 hours. The calcination was performed twice. Thus, the mixed metal oxide C1 ($NaFeO_2$) of Comparative Example 1 was obtained. The powder X-ray diffraction pattern of the mixed metal oxide C1 of Comparative Example 1 is shown in FIG. 1. FIG. 1 shows that the crystal structure of the mixed metal oxide C1 is a layered structure.
(2) Evaluation of Charge and Discharge Performance of Sodium Secondary Battery An electrode was prepared using the mixed metal oxide C1 of Comparative Example 1, and a battery was prepared using the electrode as a positive electrode of the sodium secondary battery. The constant current charge-discharge test was performed under the following conditions.
Charge and Discharge Conditions:

Charging was performed by CC (Constant Current) charging to 4.0 V at 0.1 C rate (the rate at which charging is completed in 10 hours). Discharging was performed by carrying out CC discharging at the same rate as the charging rate and cutting off at a voltage of 1.5 V. From the next cycle onward, charge and discharge were performed at the same rate as the above charging rate. As in the first cycle, charging voltage was 4.0 V, and cutoff was made at a discharging voltage of 1.5 V.

For this battery, charge and discharge was conducted repeatedly for ten cycles, and the discharge capacity at the tenth cycle was set at 100 (hereinafter, the discharge capacity at the tenth cycle in the batteries of Examples 1 to 8 is shown as a discharge capacity relative to the discharge capacity at the tenth cycle set at 100 when the charge and discharge of the battery of Comparative Example 1 was conducted repeatedly for ten cycles). The retention rate of the discharge capacity at the tenth cycle relative to the discharge capacity at the first cycle was 44%. The results are shown in Table 1.

Example 1

Na:Ca:Fe=0.99:0.01:1.00

(1) Production of Mixed Metal Oxide

Figure 2:
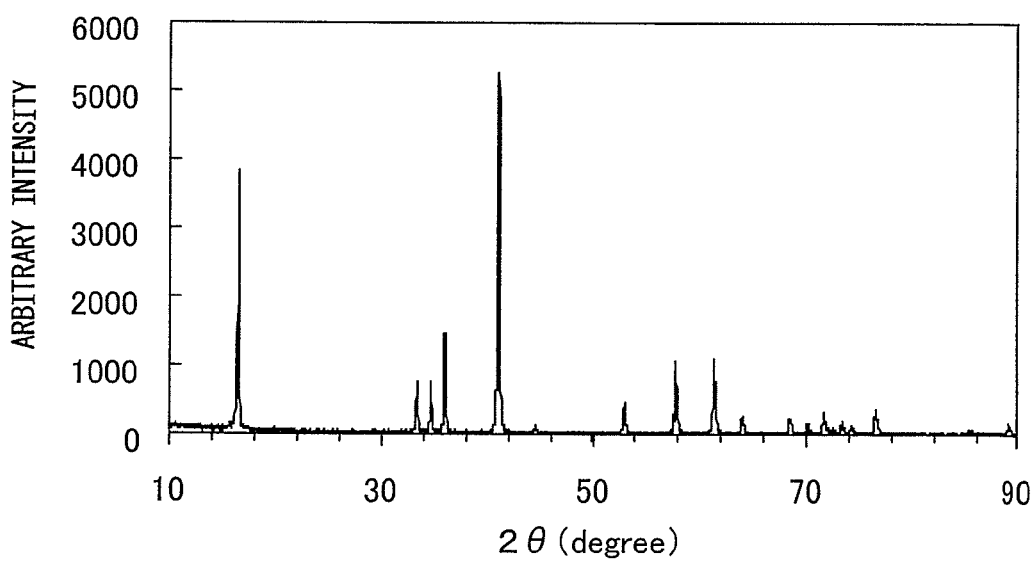
FIG. 2 shows a powder X-ray diffraction pattern of the mixed metal oxide E1.

Sodium carbonate ($Na_2CO_3$: produced by Wako Pure Chemical Industries, Ltd.: purity 99.8%), calcium carbonate ($CaCO_3$: Produced by Ube Material Industries, Ltd., CS-3NA, purity 99% or more), and iron (II, III) oxide ($Fe_3O_4$: produced by Kojundo Chemical Lab. Co., Ltd.: purity 99%) were used as a metal-containing compound. They were weighed such that the molar ratio of Na:Ca:Fe was 0.99:0.01:1.00, and mixed over 4 hours with a dry ball mill to obtain a mixture of the metal-containing compounds. The mixture of the metal-containing compounds obtained was loaded into an alumina boat, heated in an air atmosphere using an electric furnace, and calcined while maintaining at 650° C. over 2 hours. The calcination was performed twice. Thus, the mixed metal oxide E1 ($Na_{0.99}Ca_{0.01}FeO_2$) of Example 1 was obtained. The powder X-ray diffraction pattern of the mixed metal oxide E1 of Example 1 is shown in FIG. 2. FIG. 2 shows that the crystal structure of the mixed metal oxide E1 is a layered structure.

(2) Evaluation of Charge and Discharge Performance of Sodium Secondary Battery

An electrode was prepared using the mixed metal oxide E1 of Example 1, and a battery was prepared using the electrode as a positive electrode of the sodium secondary battery. The constant current charge-discharge test was performed under the same conditions as in Comparative Example 1. For this battery, the charge and discharge was conducted repeatedly for ten cycles. The relative discharge capacity at the tenth cycle was 134, and the retention rate of the discharge capacity at the tenth cycle relative to the discharge capacity at the first cycle was 44%, indicating that the incorporation of Ca increases the discharge capacity exhibited when the charge and discharge is conducted repeatedly as a sodium secondary battery. The results are shown in Table 1.

Example 2

Na:Ca:Fe=0.95:0.05:1.00

(1) Production of Mixed Metal Oxide

Figure 3:
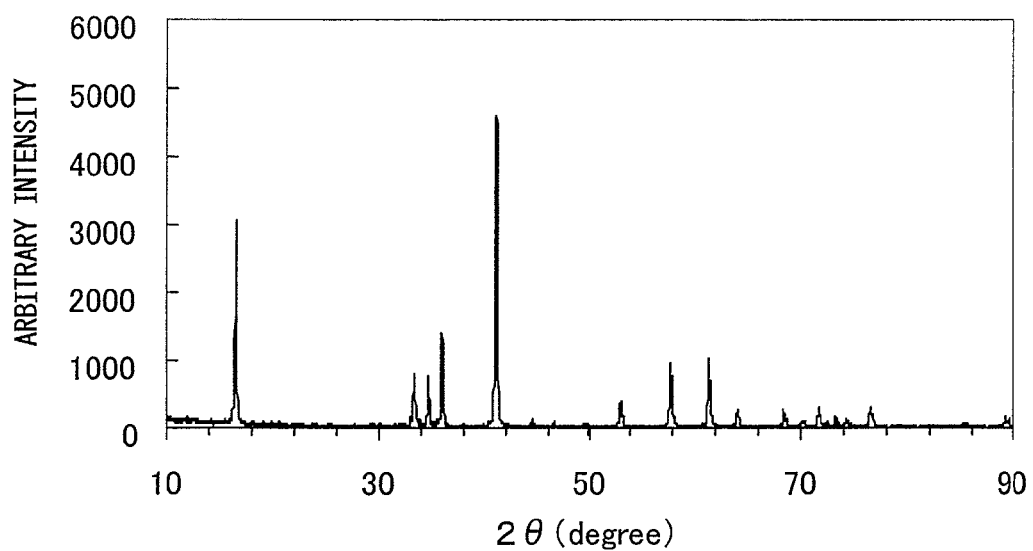
FIG. 3 shows a powder X-ray diffraction pattern of the mixed metal oxide E2.

The mixed metal oxide E2 ($Na_{0.95}Ca_{0.05}FeO_2$) of Example 2 was obtained in the same manner as in Example 1 except that the metal-containing compounds were used in such an amount that the molar ratio of Na:Ca:Fe was 0.95:0.05:1.00. The powder X-ray diffraction pattern of the mixed metal oxide E2 of Example 2 is shown in FIG. 3. FIG. 3 shows that the crystal structure of the mixed metal oxide E2 is a layered structure.

(2) Evaluation of Charge and Discharge Performance of Sodium Secondary Battery

An electrode was prepared using the mixed metal oxide E2 of Example 2, and a battery was prepared using the electrode as a positive electrode of the sodium secondary battery. The constant current charge-discharge test was performed under the same conditions as in Comparative Example 1. For this battery, the charge and discharge was conducted repeatedly for ten cycles. The relative discharge capacity at the tenth cycle was 160, and the retention rate of the discharge capacity at the tenth cycle relative to the discharge capacity at the first cycle was 52%, indicating that the incorporation of Ca increases the discharge capacity exhibited when the charge and discharge is conducted repeatedly as a sodium secondary battery. The results are shown in Table 1.

Example 3

Na:Ca:Fe=0.90:0.10:1.00

(1) Production of Mixed Metal Oxide

Figure 4:
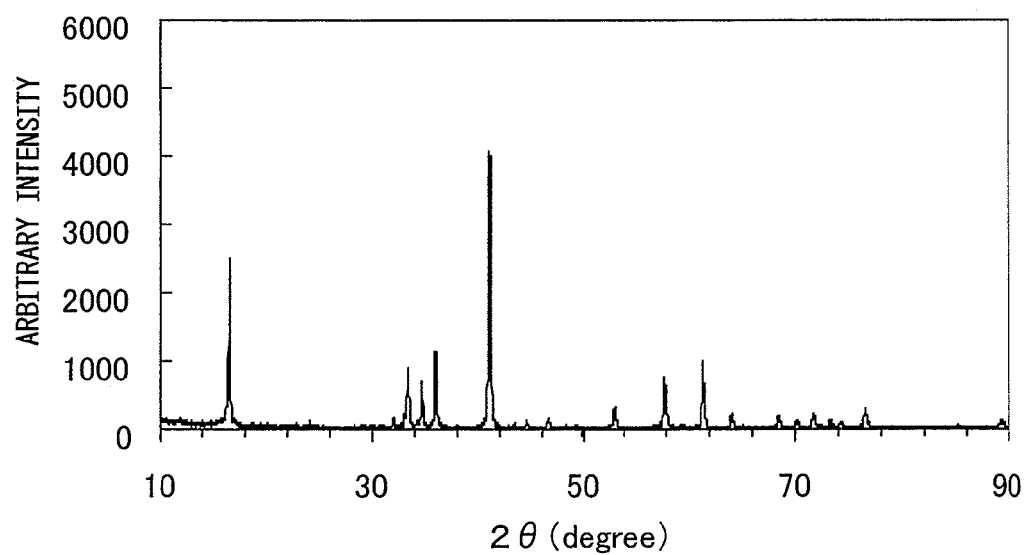
FIG. 4 shows a powder X-ray diffraction pattern of the mixed metal oxide E3.

The mixed metal oxide E3 ($Na_{0.90}Ca_{0.10}FeO_2$) of Example 3 was obtained in the same manner as in Example 1 except that the metal-containing compounds were used in such an amount that the molar ratio of Na:Ca:Fe was 0.90:0.10:1.00. The powder X-ray diffraction pattern of the mixed metal oxide E3 of Example 3 is shown in FIG. 4. FIG. 4 shows that the crystal structure of the mixed metal oxide E3 is a layered structure.

(2) Evaluation of Charge and Discharge Performance of Sodium Secondary Battery

An electrode was prepared using the mixed metal oxide E3 of Example 3, and a battery was prepared using the electrode as a positive electrode of the sodium secondary battery. The constant current charge-discharge test was performed under the same conditions as in Comparative Example 1. For this battery, charge and discharge was conducted repeatedly for ten cycles. The relative discharge capacity at the tenth cycle was 170, and the retention rate of the discharge capacity at the tenth cycle relative to the discharge capacity at the first cycle was 59%, indicating that the incorporation of Ca increases the discharge capacity exhibited when the charge and discharge is conducted repeatedly as a sodium secondary battery. The results are shown in Table 1.

Example 4

Na:Ca:Fe=0.85:0.15:1.00

(1) Production of Mixed Metal Oxide

Figure 5:
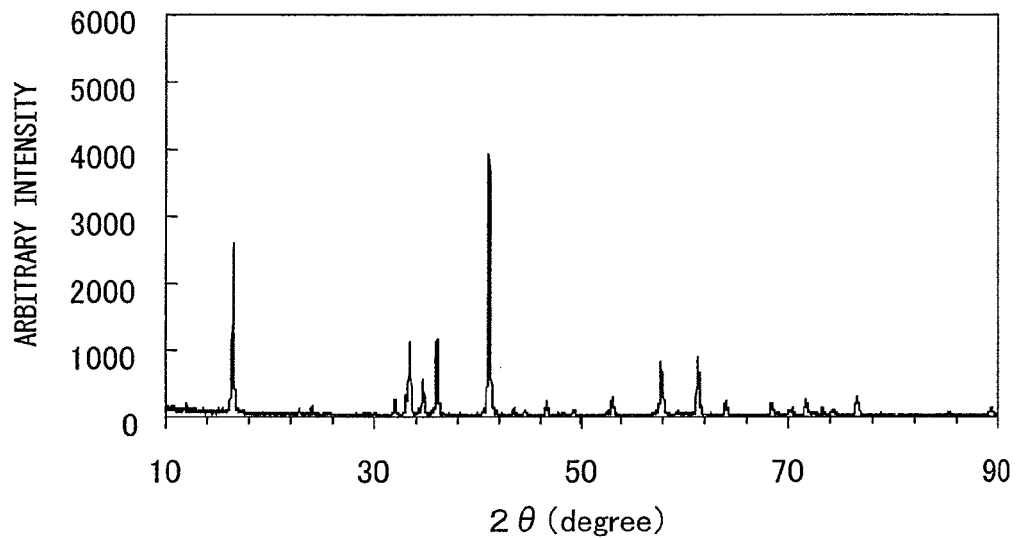
FIG. 5 shows a powder X-ray diffraction pattern of the mixed metal oxide E4.

The mixed metal oxide E4 ($Na_{0.85}Ca_{0.15}FeO_2$) of Example 4 was obtained in the same manner as in Example 1 except that the metal-containing compounds were used in such an amount that the molar ratio of Na:Ca:Fe was 0.85:0.15:1.00. The powder X-ray diffraction pattern of the mixed metal oxide E4 of Example 4 is shown in FIG. 5. FIG. 5 shows that the crystal structure of the mixed metal oxide E4 is a layered structure.

(2) Evaluation of Charge and Discharge Performance of Sodium Secondary Battery

An electrode was prepared using the mixed metal oxide E4 of Example 4, and a battery was prepared using the electrode as a positive electrode of the sodium secondary battery. The constant current charge-discharge test was performed under the same conditions as in Comparative Example 1. For this battery, the charge and discharge was conducted repeatedly for ten cycles. The relative discharge capacity at the tenth cycle was 168, and the retention rate of the discharge capacity at the tenth cycle relative to the discharge capacity at the first cycle was 60%, indicating that the incorporation of Ca increases the discharge capacity exhibited when the charge and discharge is conducted repeatedly as a sodium secondary battery. The results are shown in Table 1.

Example 5

Na:Ca:Fe=0.80:0.20:1.00

(1) Production of Mixed Metal Oxide

Figure 6:
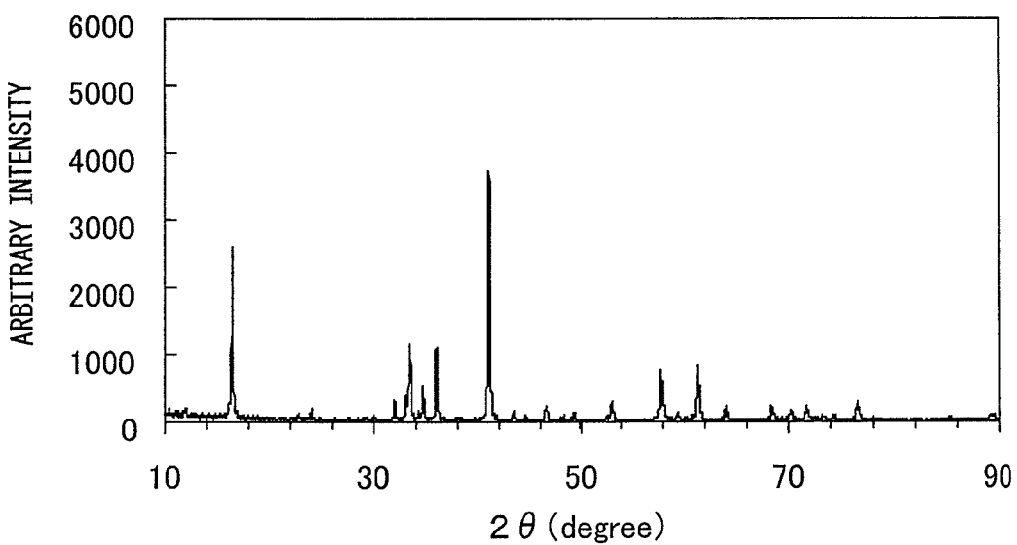
FIG. 6 shows a powder X-ray diffraction pattern of the mixed metal oxide E5.

The mixed metal oxide E5 ($Na_{0.80}Ca_{0.20}FeO_2$) of Example 5 was obtained in the same manner as in Example 1 except that the metal-containing compounds were used in such an amount that the molar ratio of Na:Ca:Fe was 0.80:0.20:1.00. The powder X-ray diffraction pattern of the mixed metal oxide E5 of Example 5 is shown in FIG. 6. FIG. 6 shows that the crystal structure of the mixed metal oxide E5 is a layered structure.

(2) Evaluation of Charge and Discharge Performance of Sodium Secondary Battery

An electrode was prepared using the mixed metal oxide E5 of Example 5, and a battery was prepared using the electrode as a positive electrode of the sodium secondary battery. The constant current charge-discharge test was performed under the same conditions as in Comparative Example 1. For this battery, the charge and discharge was conducted repeatedly for ten cycles. The relative discharge capacity at the tenth cycle was 163, and the retention rate of the discharge capacity at the tenth cycle relative to the discharge capacity at the first cycle was 61%, indicating that the incorporation of Ca increases the discharge capacity exhibited when the charge and discharge is conducted repeatedly as a sodium secondary battery. The results are shown in Table 1.

TABLE 1

| Electrode active material | Constituent element ratio | Relative discharging capacity (at the tenth cycle) | Retention rate of discharge capacity |
|---|---|---|---|
| Mixed metal oxide C1 | Na:Fe = 100:100 | 100 | 44% |
| Mixed metal oxide E1 | Na:Ca:Fe = 99:1:100 | 134 | 44% |
| Mixed metal oxide E2 | Na:Ca:Fe = 95:5:100 | 160 | 52% |
| Mixed metal oxide E3 | Na:Ca:Fe = 90:10:100 | 170 | 59% |
| Mixed metal oxide E4 | Na:Ca:Fe = 85:15:100 | 168 | 60% |
| Mixed metal oxide E5 | Na:Ca:Fe = 80:20:100 | 163 | 61% |

Example 6

Na:Sr:Fe=0.95:0.05:1.00

(1) Production of Mixed Metal Oxide

Sodium carbonate ($Na_2CO_3$: produced by Wako Pure Chemical Industries, Ltd.: purity 99.8%), strontium hydroxide octahydrate ($Sr(OH)_2 \cdot 8H_2O$: produced by Wako Pure Chemical Industries, Ltd.: purity 99% or more), and iron (II, III) oxide ($Fe_3O_4$: produced by Kojundo Chemical Lab. Co., Ltd.: purity 99%) were used as a metal-containing compound. They were weighed such that the molar ratio of Na:Sr:Fe was 0.95:0.05:1.00, and mixed over 4 hours with a dry ball mill to obtain a mixture of the metal-containing compounds. The mixture of the metal-containing compounds obtained was loaded into an alumina boat, heated in an air atmosphere using an electric furnace, and calcined while maintaining at 650° C. over 2 hours. The calcination was performed twice. Thus, the mixed metal oxide E6 ($Na_{0.95}Sr_{0.05}FeO_2$) of Example 6 was obtained.

(2) Evaluation of Charge and Discharge Performance of Sodium Secondary Battery

An electrode was prepared using the mixed metal oxide E6 of Example 6, and a battery was prepared using the electrode as a positive electrode of the sodium secondary battery. The constant current charge-discharge test was performed under the same conditions as in Comparative Example 1. For this battery, the charge and discharge was conducted repeatedly for ten cycles. The relative discharge capacity at the tenth cycle was 157, and the retention rate of the discharge capacity at the tenth cycle relative to the discharge capacity at the first cycle was 48%, indicating that the incorporation of Sr increases the discharge capacity exhibited when the charge and discharge is conducted repeatedly as a sodium secondary battery. The results are shown in Table 2.

Example 7

Na:Sr:Fe=0.90:0.10:1.00

(1) Production of Mixed Metal Oxide

The mixed metal oxide E7 ($Na_{0.90}Sr_{0.10}FeO_2$) of Example 7 was obtained in the same manner as in Example 6 except that the metal-containing compounds were used in such an amount that the molar ratio of Na:Sr:Fe was 0.90:0.10:1.00.

(2) Evaluation of Charge and Discharge Performance of Sodium Secondary Battery

An electrode was prepared using the mixed metal oxide E7 of Example 7, and a battery was prepared using the electrode as a positive electrode of the sodium secondary battery. The constant current charge-discharge test was performed under the same conditions as in Comparative Example 1. For this battery, the charge and discharge was conducted repeatedly for ten cycles. The relative discharge capacity at the tenth cycle was 154, and the retention rate of the discharge capacity at the tenth cycle relative to the discharge capacity at the first cycle was 47%, indicating that the incorporation of Sr increases the discharge capacity exhibited when the charge and discharge is conducted repeatedly as a sodium secondary battery. The results are shown in Table 2.

Example 8

Na:Sr:Fe=0.85:0.15:1.00

(1) Production of Mixed Metal Oxide

The mixed metal oxide E8 ($Na_{0.85}Sr_{0.15}FeO_2$) of Example 8 was obtained in the same manner as in Example 6 except that the metal-containing compounds were used in such an amount that the molar ratio of Na:Sr:Fe was 0.85:0.15:1.00.

(2) Evaluation of Charge and Discharge Performance of Sodium Secondary Battery

An electrode was prepared using the mixed metal oxide E8 of Example 8, and a battery was prepared using the electrode as a positive electrode of the sodium secondary battery. The constant current charge-discharge test was performed under the same conditions as in Comparative Example 1. For this battery, the charge and discharge was conducted repeatedly for ten cycles. The relative discharge capacity at the tenth cycle was 148, and the retention rate of the discharge capacity at the tenth cycle relative to the discharge capacity at the first cycle was 47%, indicating that the incorporation of Sr increases the discharge capacity exhibited when the charge and discharge is conducted repeatedly as a sodium secondary battery. The results are shown in Table 2.

TABLE 2

| Electrode active material | Constituent element ratio | Relative discharging capacity (at the tenth cycle) | Retention rate of discharge capacity |
|---|---|---|---|
| Mixed metal oxide C1 | Na:Fe = 100:100 | 100 | 44% |
| Mixed metal oxide E6 | Na:Sr:Fe = 95:5:100 | 157 | 48% |
| Mixed metal oxide E7 | Na:Sr:Fe = 90:10:100 | 154 | 47% |
| Mixed metal oxide E8 | Na:Sr:Fe = 85:15:100 | 148 | 47% |

Comparative Example 2

Na:Mn=1.00:1.00

(1) Production of Mixed Metal Oxide

Sodium carbonate ($Na_2CO_3$: produced by Wako Pure Chemical Industries, Ltd.: purity 99.8%) and manganese (IV) oxide ($MnO_2$: produced by Kojundo Chemical Lab. Co., Ltd.: purity 99.9%) were used as a metal-containing compound. They were weighed such that the molar ratio of Na:Mn was 1.00:1.00, and mixed over 4 hours with a dry ball mill to obtain a mixture of the metal-containing compounds. The mixture of the metal-containing compounds obtained was loaded into an alumina boat, heated in an air atmosphere using an electric furnace, and calcined at 800° C. over 2 hours. The calcination was performed twice. Thus, the mixed metal oxide C2 ($NaMnO_2$) of Comparative Example 2 was obtained.

(2) Evaluation of Charge and Discharge Performance of Sodium Secondary Battery

An electrode was prepared using the mixed metal oxide C2 of Comparative Example 2, and a battery was prepared using the electrode as a positive electrode of the sodium secondary battery. The constant current charge-discharge test was performed under the same conditions as in Comparative Example 1. For this battery, the charge and discharge was conducted repeatedly for ten cycles, and the discharge capacity at the tenth cycle was set at 100 (hereinafter, the discharge capacity at the tenth cycle in the batteries of Example 9 is shown as a discharge capacity relative to the discharge capacity at the tenth cycle set at 100 when the charge and discharge of the battery of Comparative Example 2 was conducted repeatedly for ten cycles). The retention rate of the discharge capacity at the tenth cycle relative to the discharge capacity at the first cycle was 61%. The results are shown in Table 3.

Example 9

Na:Ca:Mn=0.90:0.10:1.00

(1) Production of Mixed Metal Oxide

Sodium carbonate ($Na_2CO_3$: produced by Wako Pure Chemical Industries, Ltd.: purity 99.8%), calcium carbonate ($CaCO_3$: Produced by Ube Material Industries, Ltd., CS-3NA, purity 99% or more), and manganese (IV) oxide ($MnO_2$: produced by Kojundo Chemical Lab. Co., Ltd.: purity 99.9%) were used as a metal-containing compound. They were weighed such that the molar ratio of Na:Ca:Mn was 0.90:0.10:1.00, and mixed over 4 hours with a dry ball mill to obtain a mixture of the metal-containing compounds. The mixture of the metal-containing compounds obtained was loaded into an alumina boat, heated in an air atmosphere using an electric furnace, and calcined at 800° C. over 2 hours. The calcination was performed twice. Thus, the mixed metal oxide E9 ($Na_{0.90}Ca_{0.10}MnO_2$) of Example 9 was obtained.

(2) Evaluation of Charge and Discharge Performance of Sodium Secondary Battery

An electrode was prepared using the mixed metal oxide E9 of Example 9, and a battery was prepared using the electrode as a positive electrode of the sodium secondary battery. The constant current charge-discharge test was performed under the same conditions as in Comparative Example 1. For this battery, the charge and discharge was conducted repeatedly for ten cycles. The relative discharge capacity at the tenth cycle was 120, and the retention rate of the discharge capacity at the tenth cycle relative to the discharge capacity at the first cycle was 86%, indicating that the incorporation of Ca increases the discharge capacity exhibited when the charge and discharge is conducted repeatedly as a sodium secondary battery. The results are shown in Table 3.

TABLE 3

| Electrode active material | Constituent element ratio | Relative discharging capacity (at the tenth cycle) | Retention rate of discharge capacity |
|---|---|---|---|
| Mixed metal oxide C2 | Na:Mn = 100:100 | 100 | 61% |
| Mixed metal oxide E9 | Na:Ca:Mn = 90:10:100 | 120 | 86% |

Comparative Example 3

Figure 7:
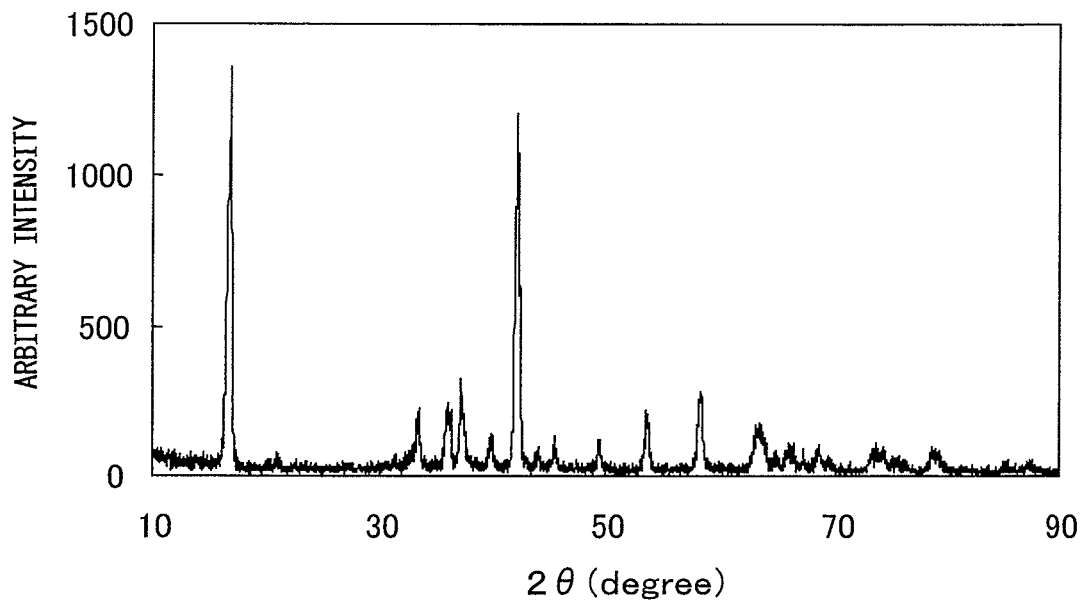
FIG. 7 shows a powder X-ray diffraction pattern of the mixed metal oxide C3.

Na:$M^2$=1.00:1.00, wherein $M^2$ is Mn, Fe, and Ni (1) Production of Mixed Metal Oxide Sodium carbonate ($Na_2CO_3$: produced by Wako Pure Chemical Industries, Ltd.: purity 99.8%), manganese (IV) oxide ($MnO_2$: produced by Kojundo Chemical Lab. Co., Ltd.: purity 99.9%), iron (II, III) oxide ($Fe_3O_4$: produced by Kojundo Chemical Lab. Co., Ltd.: purity 99%), and nickel (II) oxide (NiO: produced by Kojundo Chemical Lab. Co., Ltd.: purity 99%) were used as a metal-containing compound. They were weighed such that the molar ratio of Na:Mn:Fe:Ni was 1.00:0.60:0.20:0.20, and mixed over 4 hours with a dry ball mill to obtain a mixture of the metal-containing compounds. The mixture of the metal-containing compounds obtained was loaded into an alumina boat, heated in an air atmosphere using an electric furnace, and calcined at 800° C. over 2 hours. The calcination was performed twice. Thus, the mixed metal oxide C3 (NaMn$_{0.6}$Fe$_{0.2}$Ni$_{0.2}$O$_2$) of Comparative Example 3 was obtained. The powder X-ray diffraction pattern of the mixed metal oxide C3 of Comparative Example 3 is shown in FIG. 7. FIG. 7 shows that the crystal structure of the mixed metal oxide E5 is a layered structure.

(2) Evaluation of Charge and Discharge Performance of Sodium Secondary Battery

An electrode was prepared using the mixed metal oxide C3 of Comparative Example 3, and a battery was prepared using the electrode as a positive electrode of the sodium secondary battery. The constant current charge-discharge test was performed under the same conditions as in Comparative Example 1. For this battery, the charge and discharge was conducted repeatedly for ten cycles, and the discharge capacity at the tenth cycle was set at 100 (hereinafter, the discharge capacity at the tenth cycle in the batteries of Example 10 is shown as a discharge capacity relative to the discharge capacity at the tenth cycle set at 100 when the charge and discharge of the battery of Comparative Example 3 was conducted repeatedly for ten cycles). The retention rate of the discharge capacity at the tenth cycle relative to the discharge capacity at the first cycle was 88%. The results are shown in Table 4.

Example 10

Figure 8:
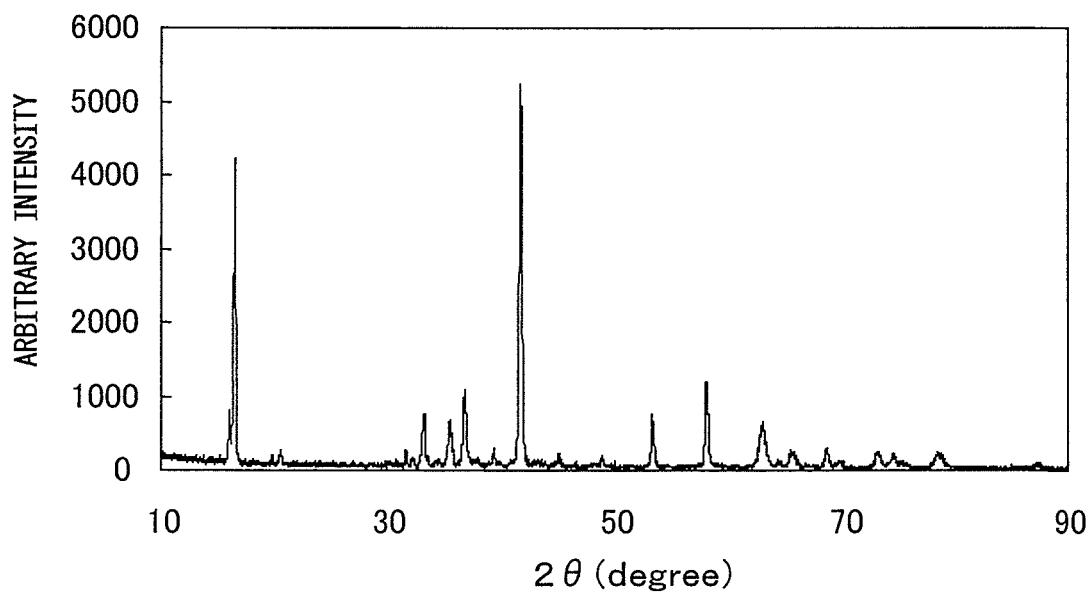
FIG. 8 shows a powder X-ray diffraction pattern of the mixed metal oxide E10.

Na:Mg:M$^2$=0.90:0.10:1.00, wherein M$^2$ is Mn Fe, and Ni (1) Production of Mixed Metal Oxide Sodium carbonate (Na$_2$CO$_3$: produced by Wako Pure Chemical Industries, Ltd.: purity 99.8%), magnesium oxide (MgO: produced by Wako Pure Chemical Industries, Ltd.: purity 99% or more), manganese (IV) oxide (MnO: produced by Kojundo Chemical Lab. Co., Ltd.: purity 99.9%), iron (II, III) oxide (Fe$_3$O$_4$: produced by Kojundo Chemical Lab. Co., Ltd.: purity 99%), and nickel (II) oxide (NiO: produced by Kojundo Chemical Lab. Co., Ltd.: purity 99%) were used as a metal-containing compound They were weighed such that the molar ratio of Na:Mg:Mn:Fe:Ni was 0.90:0.10:0.60:0.20:0.20, and mixed over 4 hours with a dry ball mill to obtain a mixture of the metal-containing compounds. The mixture of the metal-containing compounds obtained was loaded into an alumina boat, heated in an air atmosphere using an electric furnace, and calcined at 800° C. over 2 hours. The calcination was performed twice. Thus, the mixed metal oxide E10 (Na$_{0.90}$Mg$_{0.10}$Mn$_{0.6}$Fe$_{0.2}$Ni$_{0.2}$O$_2$) of Example 10 was obtained. The powder X-ray diffraction pattern of the mixed metal oxide E10 of Example 10 is shown in FIG. 8. FIG. 8 shows that the crystal structure of the mixed metal oxide E10 is a layered structure.

(2) Evaluation of Charge and Discharge Performance of Sodium Secondary Battery

An electrode was prepared using the mixed metal oxide E10 of Example 10, and a battery was prepared using the electrode as a positive electrode of the sodium secondary battery. The constant current charge-discharge test was performed under the same conditions as in Comparative Example 1. For this battery, the charge and discharge was conducted repeatedly for ten cycles. The relative discharge capacity at the tenth cycle was 119, and the retention rate of the discharge capacity at the tenth cycle relative to the discharge capacity at the first cycle was 96%, indicating that the incorporation of Mg increases the discharge capacity exhibited when the charge and discharge is conducted repeatedly as a sodium secondary battery. The results are shown in Table 4.

TABLE 4

| Electrode active material | Constituent element ratio | Relative discharging capacity (at the tenth cycle) | Retention rate of discharge capacity |
|---|---|---|---|
| Mixed metal oxide C3 | Na:M$^2$ = 100:100 | 100 | 88% |
| Mixed metal oxide E10 | Na:Mg:M$^2$ = 90:10:100 | 119 | 96% |

(1) Production of Coating Fluid for Heat Resistant Porous Layer

In 4200 g of NMP, 272.7 g of calcium chloride was dissolved, and then 132.9 g of p-phenylenediamine was added to achieve complete dissolution. To the solution obtained, 243.3 g of terephthalic acid dichloride was slowly added for polymerization to obtain a para-aramid. The solution was further diluted with NMP to obtain a para-aramid solution (A) having a concentration of 2.0% by weight. To 100 g of the para-aramid solution obtained, 2 g of alumina powder (a) (ALUMINA C produced by Nippon Aerosil Co., Ltd.; average particle size: 0.02 μm) and 2 g of alumina powder (b) (Sumicorundum AA03 produced by Sumitomo Chemical Co., Ltd.; average particle size: 0.3 μm), totaling 4 g, were added as a filler and mixed. The resulting mixture was treated with a nanomizer three times, further filtered through a wire net of 1-000 mesh, and defoamed under reduced pressure to produce a slurry coating fluid (B). The weight of the alumina powder (filler) based on the total weight of the para-aramid and alumina powder is 67% by weight.

(2) Production and Evaluation of Laminated Film

As a porous film, a polyethylene porous film (film thickness: 12 μm; air permeability: 140 sec/100 cc; average pore size: 0.1 μm; and porosity: 50%) was used. The polyethylene porous film was fixed on a 100-μm-thick PET film, and the slurry coating fluid for a heat resistant porous layer was applied on the porous film using a bar coater produced by TESTER SANGYO CO., LTD. The applied porous film on the PET film, while being integrated, was immersed in water, a poor solvent, and a para-aramid porous membrane (heat resistant porous layer) was deposited, after which the solvent was dried and the PET film was peeled off to obtain a laminated film which had the heat resistant porous layer and the porous film laminated to each other. The laminated film had a thickness of 16 μm, and the para-aramid porous membrane (heat resistant porous layer) had a thickness of 4 μm. The laminated film had an air permeability of 180 sec/100 cc and a porosity of 50%. The cross section of the heat resistant porous layer in the laminated film was observed by scanning electron microscope (SEM), and it was shown that the laminated film had relatively small micropores of about 0.03 μm to 0.06 μm and relatively large micropores of about 0.1 μm to 1 μm. Evaluation of the laminated film was performed as described in (A) to (C) below.

(A) Measurement of Thickness

The thickness of the laminated film and the thickness of the porous film were measured in accordance with JIS Standard (K7130-1992). As the thickness of the heat resistant porous layer, a value obtained by subtracting the thickness of the porous film from the thickness of the laminated film was used.

(B) Measurement of Air Permeability According to the Gurley Method

The air permeability of the laminated film was measured according to JIS P8117 by a digitally timed Gurley densometer manufactured by Yasuda Seiki seisakusho LTD.

(C) Porosity

A Sample of the laminated film obtained was cut into a square with sides of 10 cm, and the weight W (g) and thickness D (cm) were measured. The weight $W_i$ (g) of each layer in the sample was determined, and the volume of each layer was determined from $W_i$ and the true density $\rho_i$ (g/cm$^3$) of the material of each layer. The porosity (% by volume) was determined by the following equation:

Porosity (% by volume)=100×[1−($W_1/\rho_1$+ $W_2/\rho_2$+ . . . +$W_n/\rho$)/(10×10×D)]

In the above-described Examples, a sodium secondary battery that can further prevent thermal film rupture can be obtained by using as a separator the laminated film obtained in Production Example.

INDUSTRIAL APPLICABILITY

The present invention provides a sodium secondary battery having a larger discharge capacity exhibited when a charge and discharge is conducted repeatedly than that of conventional sodium secondary batteries, and a mixed metal oxide that can be used as an electrode active material thereof.

The invention claimed is:

1. A mixed metal oxide comprising Na, $M^1$, and $M^2$, where $M^1$ represents at least one element selected from the group consisting of Mg, Ca, Sr, and Ba; and $M^2$ represents at least one element selected from the group consisting of Mn, Fe, and Ni, wherein the molar ratio of Na:$M^1$:$M^2$ is a:b:1, where a is a value within the range of not less than 0.5 and less than 1; b is a value within the range of more than 0.01 and not more than 0.1; and "a+b" is a value within the range of more than 0.5 and not more than 1, the mixed metal oxide is represented by the following formula (1):

$$Na_a M^1_b M^2 O_2 \tag{1}$$

$M^2$ comprises Fe, and the mixed metal oxide includes a layered structure.

2. The mixed metal oxide according to claim 1, wherein $M^1$ comprises Ca.

3. The mixed metal oxide according to claim 1, wherein $M^1$ comprises Sr.

4. An electrode active material containing the mixed metal oxide according to claim 1.

5. An electrode comprising the electrode active material according to claim 4.

6. A sodium secondary battery comprising the electrode according to claim 5 as a positive electrode.

7. The sodium secondary battery according to claim 6, further comprising a separator.

8. The sodium secondary battery according to claim 7, wherein the separator is a separator comprising a laminated film which has a heat resistant porous layer and a porous film laminated to each other.

* * * * *